(12) United States Patent
Fusejima et al.

(10) Patent No.: US 8,555,805 B2
(45) Date of Patent: Oct. 15, 2013

(54) PAN COATING APPARATUS

(75) Inventors: Yasutoyo Fusejima, Shinjuku-ku (JP);
Takuya Nakamura, Shinjuku-ku (JP);
Takashi Terada, Shinjuku-ku (JP);
Shigemi Isobe, Shinjuku-ku (JP)

(73) Assignee: Freund Corporation, Tokyo (JP)

( * ) Notice: Subject to any disclaimer, the term of this patent is extended or adjusted under 35 U.S.C. 154(b) by 251 days.

(21) Appl. No.: 13/124,716

(22) PCT Filed: Oct. 9, 2009

(86) PCT No.: PCT/JP2009/067617
§ 371 (c)(1),
(2), (4) Date: Apr. 18, 2011

(87) PCT Pub. No.: WO2010/047238
PCT Pub. Date: Apr. 29, 2010

(65) Prior Publication Data
US 2011/0197810 A1    Aug. 18, 2011

(30) Foreign Application Priority Data

Oct. 21, 2008   (JP) .................................. 2008-270888

(51) Int. Cl.
| | | |
|---|---|---|
| A23G 3/20 | (2006.01) | |
| B05C 5/00 | (2006.01) | |
| B05C 3/00 | (2006.01) | |
| B05B 17/00 | (2006.01) | |
| B05B 7/06 | (2006.01) | |
| B05B 13/04 | (2006.01) | |

(52) U.S. Cl.
USPC ................. 118/19; 118/16; 118/24; 118/303; 118/313; 118/320; 118/418; 427/242

(58) Field of Classification Search
USPC ......... 118/300–325, 16–25; 427/242
See application file for complete search history.

(56) References Cited

U.S. PATENT DOCUMENTS 4,478,171 A * 10/1984 Bridges et al. ............... 118/303
4,545,156 A * 10/1985 Hockett ........................ 118/323

(Continued)

FOREIGN PATENT DOCUMENTS

| JP | 62-234567 | 10/1987 |
| JP | 63-97252 | 4/1988 |

(Continued)

OTHER PUBLICATIONS

International Preliminary Report on Patentability issued May 26, 2011 in International (PCT) Application No. PCT/JP2009/067617, together with English translation thereof.

(Continued)

*Primary Examiner* — Dah-Wei Yuan
*Assistant Examiner* — Binu Thomas
(74) *Attorney, Agent, or Firm* — Wenderoth, Lind & Ponack, L.L.P.

(57) ABSTRACT

A spray gun (31) is attached to a multi-function unit (32) movable in a horizontal direction and a perpendicular direction. The spray gun (31) is mounted to a support holder (33), and the support holder (33) is connected to a support arm (35) of the multi-function unit (32). The support arm (35) is attached to a unit cover (36) which is openable/closable with respect to a casing (2). The support holder (33) and the support arm (35) can hide and house a liquid hose and an air hose therein so that the hoses and the like are arranged in an apparatus in such a state as to be completely free from being exposed. An installation position of the spray gun (31) can be finely adjusted by the multi-function unit (32) during a coating process, thereby enabling a control for keeping constant distances between tablet surfaces and the spray gun (31).

9 Claims, 14 Drawing Sheets

(56) References Cited

U.S. PATENT DOCUMENTS

| | | | |
|---|---|---|---|
| 6,557,486 B2 * | 5/2003 | Giogoli | 118/19 |
| 2006/0096527 A1 * | 5/2006 | Hasegawa et al. | 118/19 |
| 2007/0261634 A1 * | 11/2007 | Hasegawa et al. | 118/319 |
| 2008/0193632 A1 * | 8/2008 | O'Hara et al. | 118/303 |
| 2008/0271668 A1 * | 11/2008 | Hasegawa et al. | 118/19 |

FOREIGN PATENT DOCUMENTS

| | | |
|---|---|---|
| JP | 8-24741 | 1/1996 |
| JP | 8-57289 | 3/1996 |
| JP | 8-173868 | 7/1996 |
| JP | 2573584 | 10/1996 |
| JP | 2003-62500 | 3/2003 |
| JP | 2006-26592 | 2/2006 |

OTHER PUBLICATIONS

International Search Report issued Nov. 24, 2009 in International (PCT) Application No. PCT/JP2009/067617.

* cited by examiner (a)

(b)

(a)

| | AIR-SUPPLY CIRCUIT | AIR-EXHAUST CIRCUIT | | EVAPORATED MIST | MIST-COOLING |
|---|---|---|---|---|---|
| PRE-COOL | × | × | | (○) | ON |
| SPRAY | × | × | | (○) | ON |
| POSE 1 | × | × | | (○) | ON |
| POSE 2 | × | ○ | | × | OFF |
| DRY | ○ | ○ | | × | OFF |

(b)

PAN COATING APPARATUS

The present application is a national stage entry of PCT/JP2009/067617, filed Oct. 9, 2009.

TECHNICAL FIELD

The present invention relates to a pan-type coating apparatus for performing a coating process on tablets and powder and particle, and more particularly, to a pan coating apparatus including a spray gun for spraying a coating liquid and the like, the spray gun having higher operability and washability.

BACKGROUND ART

Conventionally, coating apparatuses using a rotary drum have been known as manufacturing apparatuses for medicine, food, and the like. For example, Patent Document 1 discloses an apparatus in which a rotary drum having a polygonal shape in cross-section (octagonal shape in this case) is rotated about a horizontal axis. Such a rotary drum is also referred to as a coating pan, and spray guns for supplying coating liquids are arranged in the drum. The spray guns are fixed to a support arm and the like installed in the drum, and are connected to air hoses and liquid hoses drawn-in from an outside of the drum. Powder and particle thrown into the rotary drum tumble in accordance with rotation of the drum. To surfaces of the rolling granular solids, coating liquids such as a sugar-coating liquid are sprayed from the spray guns. Simultaneously with spraying of the coating liquids, a hot air and a cool air are appropriately supplied into the rotary drum and exhausted therefrom. In this manner, formation and drying of coating layers are promoted.

When a sugar-coating process is performed in such a coating apparatus, first, objects to be processed as cores (such as tablets, hereinafter, the tablets are taken as a typical example) are housed in the rotary drum. After that, with the rotary drum being rotated, the coating liquids (sugar-coating liquid) and binder liquids are supplied into the drum so as to adhere to outer peripheries of the tablets. During the coating process, a hot air at approximately of from 50 to 100° C. is appropriately blown to the tablets. The hot air causes the sugar-coating liquid to be evaporated and solidified on the surfaces of the tablets so that the coating layers are formed. Then, operations of adding the coating liquids and then drying the same are repeated. Through the repetitive operations, the coating layers are laminated on the outer peripheries of the tablets again and again. In this manner, sugar-coating layers are formed.

Meanwhile, in such a coating apparatus, during the coating process, the sprayed coating liquids, raw materials of the granular solids, and the like enter a state of being floated by airflow in the apparatus. Thus, when the spray guns are arranged in an exposed state in the drum, in some cases, the floated coating liquids and granular solids may adhere to and accumulate on the spray guns. When contamination is increased by an increase in amount of adhering matters onto the spray guns, cleaning man-hours increase in accordance therewith. In addition, the adhering matters peel from the guns and fall in the drum so as to adhere to the tablets and the like, which causes deterioration such as an external appearance. Therefore, conventionally, as disclosed in Patent Document 2, there has been proposed an apparatus in which the spray guns are housed in a box-like case so that adhesion of floated matters onto the spray guns is suppressed and that washability is enhanced.

Further, with regard to the coating process, the coating layers formed on the tablets cause a tablet bed in the drum to vary in height. Accordingly, during the coating process, it is necessary to appropriately adjust positions of the spray guns so that a distance between the tablet bed and the spray guns are kept constant. Thus, conventionally, there has been proposed a coating apparatus having a structure in which the positions of the spray guns are vertically moved. For example, Patent Document 1 describes a structure in which the spray guns are vertically moved in an orthogonal direction with respect to a layer of an object to be processed, in other words, in directions of 45° with respect to the horizon so that the distance therebetween is maintained.

Patent Document 1: JP 2003-62500 A
Patent Document 2: JP 2573584 B
Patent Document 3: JP 08-173868 A
Patent Document 4: JP 2006-26592 A

DISCLOSURE OF THE INVENTION

Problems to be Solved by the Invention

However, conditions and behaviors of the tablet bed during the coating process vary in accordance with conditions of undergoing the process, and a positional relation between the spray guns and the layer of the object to be processed varies in a complicated manner. Thus, as in the conventional coating apparatuses, when moving directions of the spray guns are fixed, there arises such a problem that it is impossible to follow the momentarily-varying relation with the objects to be processed. Specifically, the spray guns cannot necessarily be adjusted to optimum positions by the conventional movement in one direction. Thus, in some cases, it is necessary to stop the apparatus so as to adjust the positions of the spray guns.

Further, to the spray guns, there are connected peripheral components such as the air hoses for supplying the compressed air to the guns and the liquid hoses for supplying the coating liquids and the like thereto. Matters adhere even to a small exposed part of the peripheral components, which leads to problems such as occurrence of defective products and an increase in washing man-hour. Further, at the time of the sugar-coating process, normally, sugar coating is performed after film coating as undercoating in many cases. In the conventional coating apparatuses, after performing the film coating as the undercoating, the sugar-coating process is performed with the sugar coating spray gun by exchanging the film-coating spray gun for the sugar coating one. However, attachment work on the spray guns into the drum and removal work on the guns to the outside of the drum for the purpose of cleaning and the like are manually performed. Accordingly, a work time period for component exchange is required, which leads to time loss.

It is an object of the present invention to achieve a higher degree of freedom in adjustment of the positions of the spray guns so that, during the coating process, the spray guns can be constantly set to optimum positions. Further, it is another object of the present invention to reduce adhesion of contamination-causative substances onto the spray guns and the peripheral components thereof and to enhance a property of maintenance such as washing. In addition, it is still another object of the present invention to omit the exchange work on the spray guns during the coating process so that productivity is enhanced.

Means for Solving the Problems

A pan coating apparatus according to the present invention includes: a rotary drum provided rotatably about a substantially horizontal rotation axis; a casing for housing the rotary drum; and a spray gun installed in the rotary drum, in which the spray gun is attached to a multi-function unit movable in a horizontal direction and a perpendicular direction.

In the pan coating apparatus according to the present invention, the spray gun is attached to the multi-function unit as described above. With this, a degree of freedom in adjustment of a position of the spray gun becomes higher, and hence, even during a coating process, the spray gun can be constantly set to an optimum position. Thus, a control for keeping distances constant between tablet surfaces and the spray gun can be easily and accurately effected.

In the pan coating apparatus, the multi-function unit may include a support arm capable of housing therein a hose connected to the spray gun without exposing the hose to an outside, and the spray gun may be mounted to a support holder connected to the support arm and capable of housing therein the hose without exposing the hose to the outside. With this, in such a state as to be completely free from being exposed, hoses such as liquid hoses and air hoses, hose joints, and the like can be arranged in the apparatus. As a result, a hidden-piping state can be achieved.

Further, the support arm and the support holder may be connected through intermediation of a hinge to each other so as to be rotatable relative to each other, and the support arm may be attached to a unit cover attached to the casing so as to be openable/closable. The support arm may include an upper pipe portion provided so as to be movable in an axial direction and connected to the support holder, and a lower pipe portion fixed to the unit cover. The upper pipe portion may be moved along the axial direction so that the multi-function unit moves between a low position L and a high position H.

Further, the multi-function unit may include a multi-movement mechanism including a vertical-movement mechanism and a lateral-movement mechanism, and the support arm may be attached to the multi-movement mechanism.

In addition, the spray gun may include spray guns of a plurality of types for different purposes, and for example, the spray guns of the plurality of types may include a sugar-coating spray gun and a film-coating spray gun. Further, the multi-function unit may further include a washing nozzle incorporated therein so that steps from coating to washing are continuously performed.

Effects of the Invention

According to the pan coating apparatus of the present invention, the coating spray guns are attached to the multi-function unit movable in the horizontal direction and the perpendicular direction. As a result, the degree of freedom in adjustment of the positions of the spray guns becomes higher, and hence installation positions of the spray guns can be finely adjusted. Thus, even during the coating process, the spray guns can be constantly set to the optimum positions, and hence the control for keeping the distances constant between the tablet surfaces and the spray guns can be effected with high accuracy. Accordingly, without stopping of the apparatus, the coating process can be continuously performed, which enables reduction of man-hours for the coating-process.

Further, the multi-function unit includes the support arm capable of housing therein the hoses without exposing the hoses to the outside, and the spray guns are mounted to the support holder connected to the support arm and capable of housing therein the hoses without exposing the hoses to the outside. Thus, in such a state as to be completely free from being exposed, the hoses such as the liquid hoses and the air hoses, the hose joints, and the like can be arranged in the apparatus. Thus, contamination of the hoses and the like can be suppressed, and an incidence of defective products and washing man-hours can be reduced.

Further, the spray guns of the plurality of types for the different purposes, such as the sugar-coating spray gun and the film-coating spray gun, are installed to the multi-function unit. Thus, without exchange work, the steps from undercoating to sugar-coating can be continuously performed. Therefore, man-hours required for the exchange work can be reduced, and hence a work time period is shortened and power saving is achieved. As a result, the coating process can be more efficiently performed.

Figure 1:
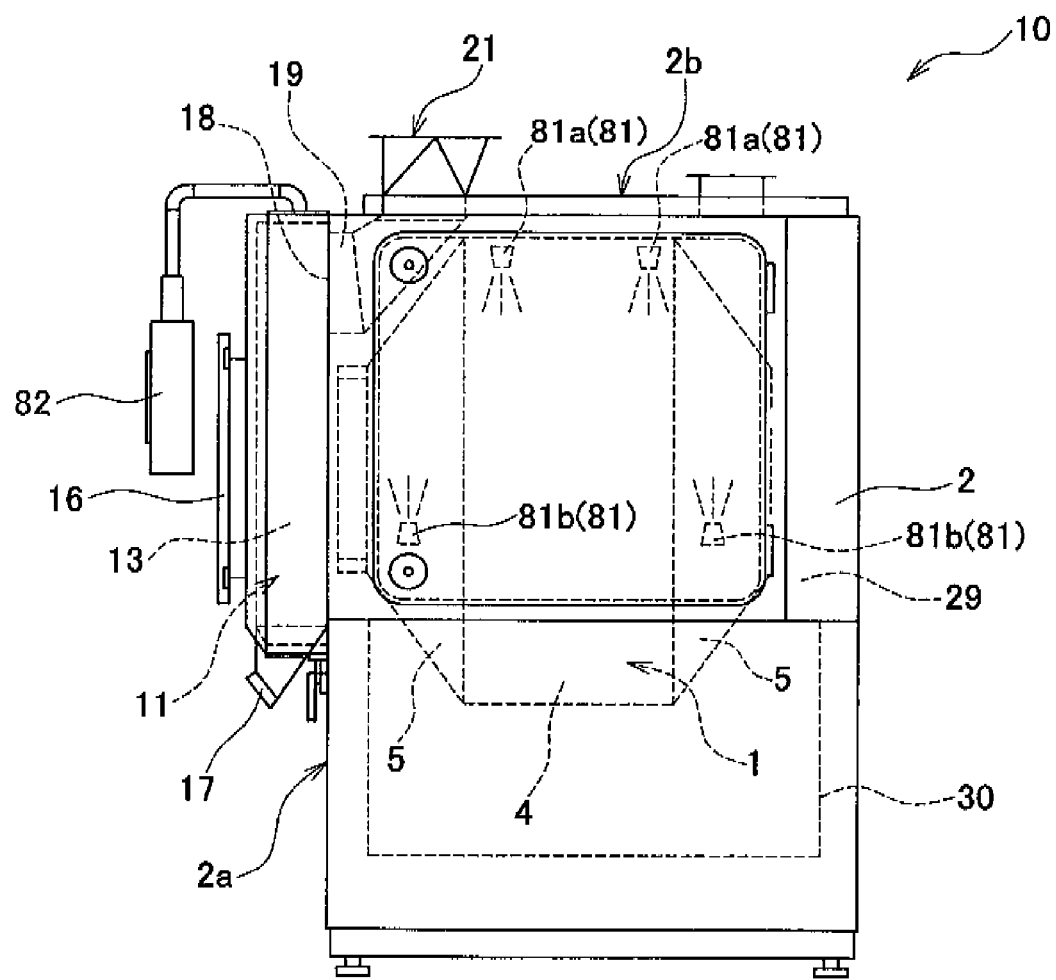
FIG. 1 A right-side view of a structure of a pan coating apparatus according to an embodiment of the present invention.

EXPLANATION OF REFERENCE SYMBOLS 1 rotary drum
2 casing
2a front wall
2b upper surface
3 tablet (object to be processed)
4 barrel portion
5 conical portion
6 vent
7 front-surface opening portion
8 end plate
9 rotary shaft
10 pan coating apparatus
11 chamber door
12 hinge
13 air supply chamber
13a front inner wall of air supply chamber
14 monitoring window 15 maintenance door
16 grip bar
17 product delivery port
18 air supply hole
19 air supply duct
21 air supply port
22 wind-direction plate
23 frame body
24 louver
25 front cover
26 baffle
27 vent
28 baffle-attachment hole
29 drum chamber
30 sink
31 spray gun
31a sugar-coating spray gun
31b film-coating spray gun
32 multi-function unit
33 support holder
34a hinge
34b hinge
35 support arm
35a upper pipe portion
35b lower pipe portion
35c connection port
36 unit cover
37 arm guide
38 bracket
39 air cylinder
40 bracket
41 multi-movement mechanism
41a vertical-movement mechanism
41b lateral-movement mechanism
42 multi-movement mechanism
43 bracket
44 vertical-movement base
45 shaft holder
46a, 46b guide block
47 nut block
48 guide rod
49 lateral-movement base
51 shaft holder
52 screw rod
53 screw holder
54 screw holder
55a, 55b gear
56 vertical-movement knob
57 shaft holder
58a, 58b guide block
59 nut block
60 guide rod
61 unit base
62 shaft holder
63 screw rod
64 screw holder
65 screw holder
66a, 66b gear
67 lateral-movement knob
68 vertical-movement motor
69 lateral-movement motor
71 air exhaust duct
72 seal duct
73 air exhaust port
74 upper duct
75 evaporated-mist exhaust port
76 evaporated-mist intake port
81 spray nozzle
81a spray nozzle for barrel portion
81b spray nozzle for conical portion
82 control panel
H high position
L low position
O rotation axis
θ angle

BEST MODE FOR CARRYING OUT THE INVENTION

Figure 2:
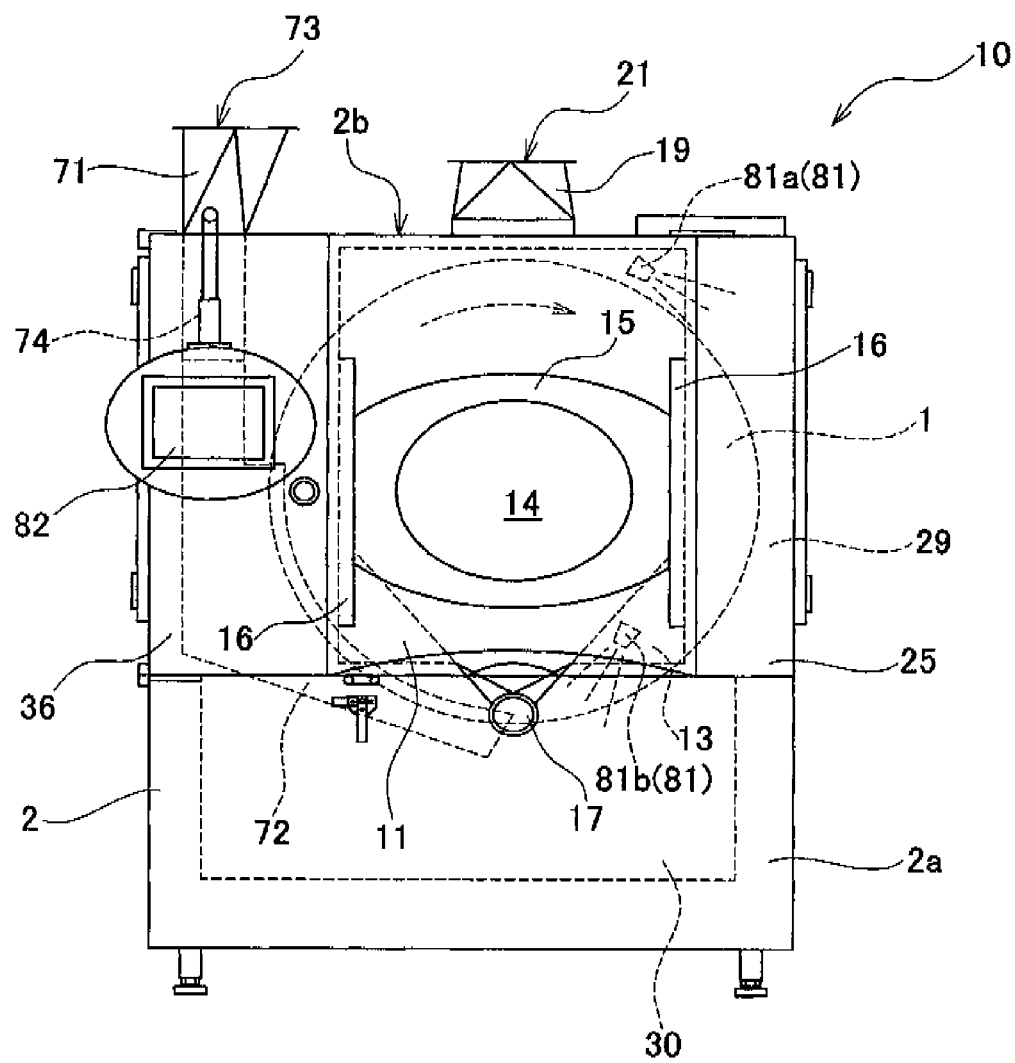
FIG. 2 A front view of the pan coating apparatus of FIG. 1.
Figure 3:
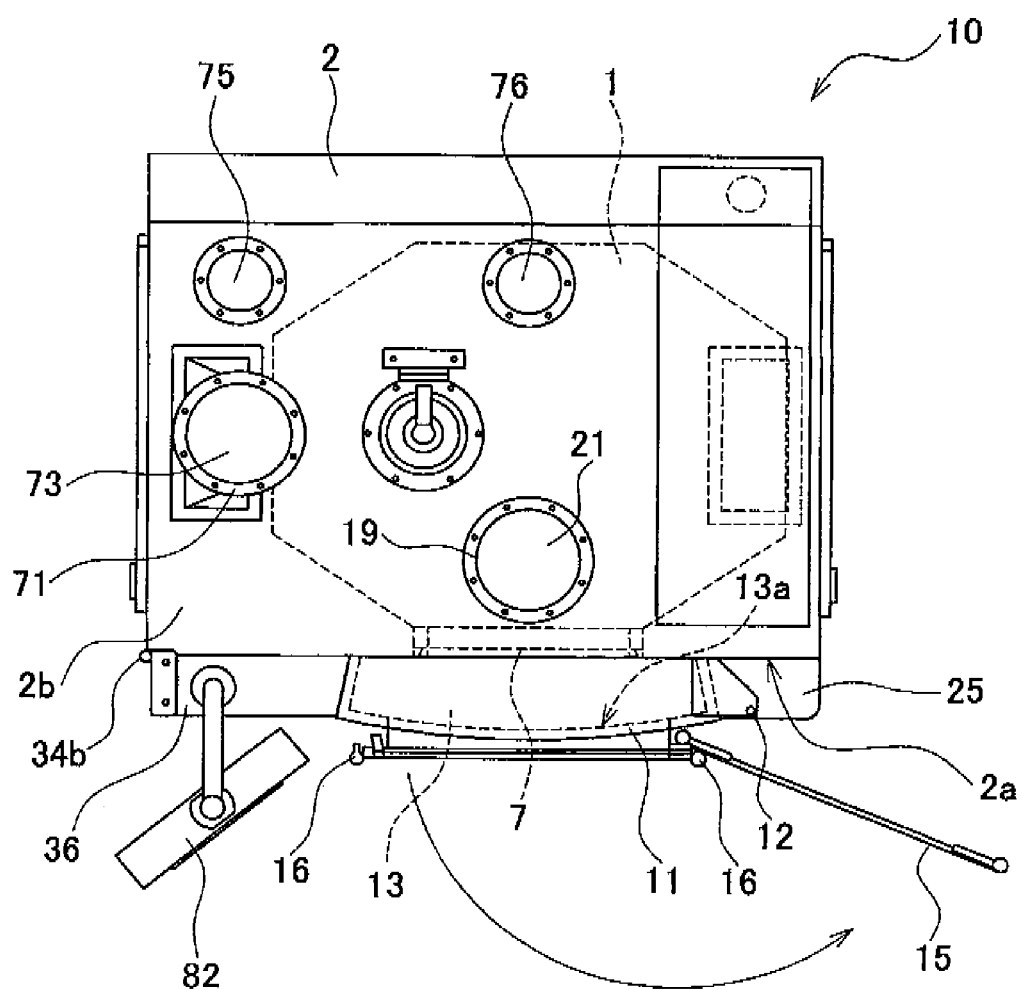
FIG. 3 A plan view (top view) of the pan coating apparatus of FIG. 1.
Figure 4:
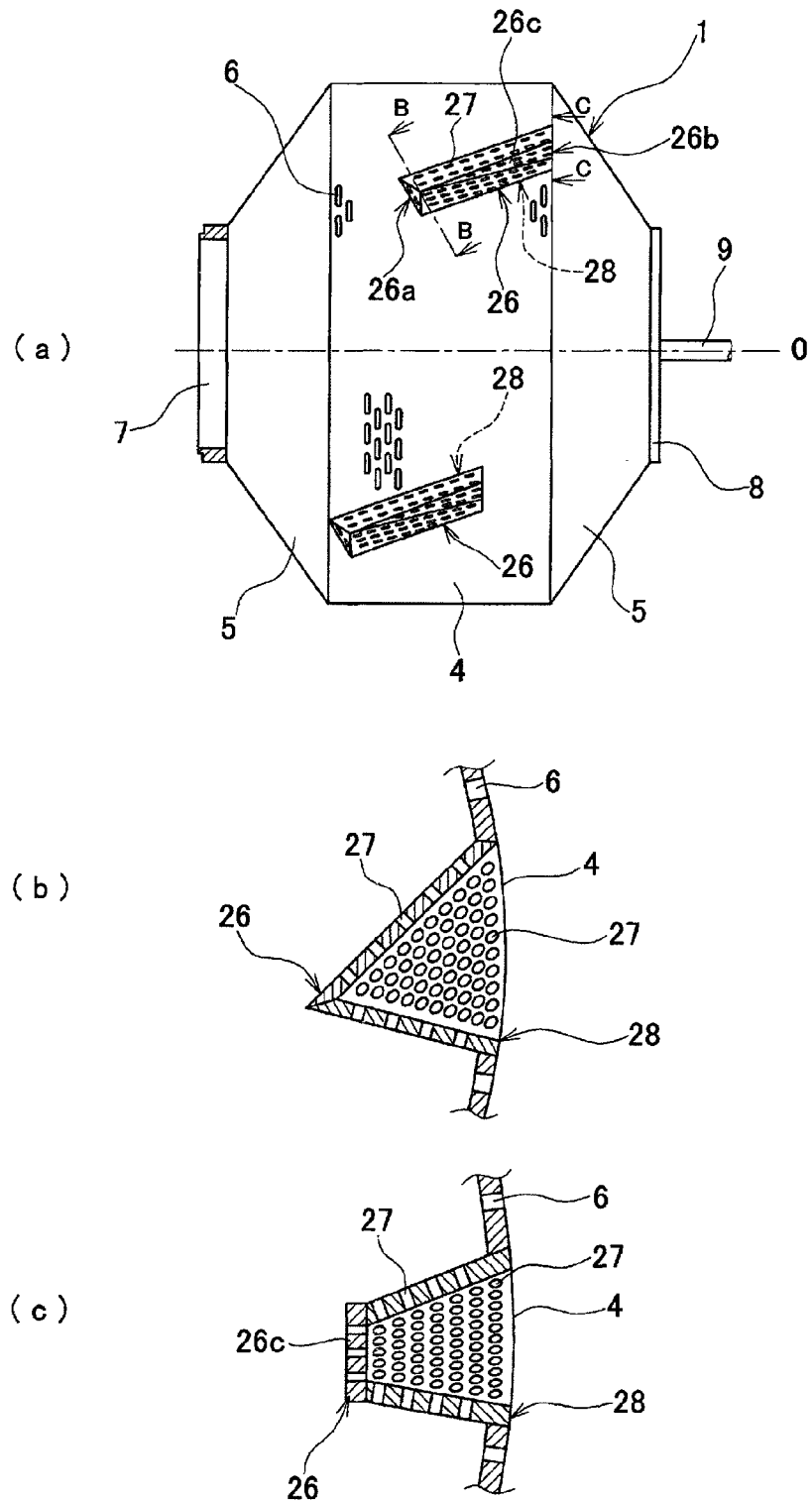
FIG. 4(a) is a side view of a rotary drum, and (b) and (c) are explanatory diagrams illustrating a structure of a three-dimensional ventilation baffle installed in the rotary drum.

In the following, detailed description is made of an embodiment of the present invention with reference to figures. FIG. 1 is a right-side view of a structure of a pan coating apparatus 10 (hereinafter, abbreviated as coating apparatus 10) according to an embodiment of the present invention, FIG. 2 is a front view thereof, and FIG. 3 is a plan view (top view) thereof. The apparatus of FIG. 1 is a jacketless-type coating apparatus using what is called an overall-punched type rotary drum. In the coating apparatus 10, a rotary drum (coating pan, hereinafter, abbreviated as drum) 1 houses objects to be processed such as tablets, and then a coating liquid is sprayed to the objects to be processed in the drum. In this manner, a coating process is performed on the objects to be processed.

As illustrated in FIGS. 1 to 4, in the coating apparatus 10, the drum 1 is rotatably installed at a center portion of a casing 2. The drum 1 is rotated about a substantially horizontal rotation axis O. The objects to be processed such as chewing gum, chocolate, and tablets are thrown into the drum 1. Note that, in the following, the tablets are taken as a representative of the objects to be processed, and description is made of the embodiment of the present invention by way of an example of a coating process with respect to tablets 3 thrown into the drum 1.

Generally, a drum (inclined pan) having a rotation axis inclined with respect to the horizon has tablet capacity larger than that of a drum rotated about the horizon, and hence has a large processing amount. On the other hand, in the inclined drum, the tablets therein are classified by gravity, and hence coated products widely vary from each other, which is disadvantageous in precise coating process. In addition, although a filling rate of the tablets into the drum increases, a height of a layer of the tablets housed therein increases, and hence own weight of the tablets increases. Thus, damage on the raw-material tablets and the like increases. In terms of this, the horizontal-rotation type drum less involves those problems, and hence is suitable to a high-quality coating process.

FIG. 4(a) is a side view of the drum 1. The drum 1 includes a cylindrical barrel portion 4 and a truncated conical portion 5 which is formed at each end of the barrel portion 4. The barrel portion 4 is formed of porous stainless plates. A large number of vents 6 cause an outer periphery of the barrel portion 4 to be ventable. The conical portion 5 is formed of a non-porous stainless plate member. A front-surface opening portion 7 is formed in the conical portion 5 on one side. The conical portion 5 on another side is closed by an end plate 8, and a rotary shaft 9 is attached thereto.

On an inside of the drum 1, baffles 26 are arranged for disturbing a tumbling flow of the tablets so as to enhance mix-stirring efficiency. FIG. 4(b) is an explanatory diagram illustrating the structure of the baffle 26. The baffles 26 are also formed of porous stainless plates provided with a large number of vents 27. As illustrated in FIG. 4(b), each of the baffles 26 is formed in a substantially triangular mountain-like shape in cross-section. Each of the baffles 26 is fixed to a baffle-attachment hole 28 formed in the barrel portion 4. The baffle-attachment hole 28 is a rectangular opening. The baffle-attachment hole 28 has an edge to which a bottom edge portion of each of the baffles 26 is welded. The baffles 26 are arranged in a projecting manner in the drum 1. With this, the three-dimensional ventilation baffles are provided upright on the inside of the drum 1.

In this manner, when the baffle 26 itself has a three-dimensional ventilation structure, mix-stirring of the tablets are promoted. In addition, ventilation loss of a processed gas is eliminated. Specifically, as for a baffle that does not have the ventilation structure, when the processed gas is exhausted from the inside of the drum, a part corresponding to the baffle acts as a barrier so as to hinder ventilation, which may cause pulsation in the exhaust air. In terms of this, in the coating apparatus 10, the baffle 26 has the ventilation structure. Thus, communication of the air is not hindered, and the pulsation in the exhaust air is suppressed. Accordingly, the pulsation suppressing effect exerted by a jacketless structure with respect to the ventilation air can be further enhanced, and the coating process can be performed without disturbance of spray patterns. Further, the baffles 26 increase a heat radiation area of the drum 1, and the baffles 26 and the barrel portion 4 are uniformly cooled by mist-cooling described later. Thus, drum-cooling efficiency is enhanced.

On a right side of the drum 1 of FIG. 1, there is arranged a drum-rotating mechanism (not shown) using an electric drum-driving motor. As described above, the rotary shaft 9 is fixed to the right end side (another end side) of the drum 1. A sprocket (not shown) is attached to the rotary shaft 9. The sprocket is connected through intermediation of a chain to a motor-side sprocket installed in the casing 2. When the motor is rotated, the drum 1 is chain-driven in accordance with the rotation of the motor so as to be rotated about the rotation axis O. Note that, a roller (not shown) supports the left end side of the drum 1 of FIGS. 1 and 4.

The casing 2 has a dual structure therein provided with a drum chamber 29 for housing the drum 1. A sink 30 is provided in a lower portion of the drum chamber 29. The sink 30 has a water-tight structure including a drain port (not shown) provided at a bottom portion thereof, and hence is capable of storing therein a washing liquid such as water. At the time of washing of the coating apparatus 10, the washing liquid is pooled in the sink 30, and then the drum 1 is rotated. In this manner, the inside and an outside of the drum are washed with the pooled liquid. After washing of the drum, the washing liquid is discharged from the drain port described above, and rinsing, drying, and the like are appropriately performed.

The front of the casing 2 (left side of FIG. 1, refer to FIG. 2) has a tripartite structure. A chamber door 11 is arranged at the center of the front of the casing. The chamber door 11 is a rectangular parallelepiped box-like member having a size of approximately 900 mm×1100 mm×200 mm. The chamber door 11 is supported by a hinge 12 with respect to the casing 2 so as to be openable/closable. The chamber door 11 has a box-like shape in which a front-wall-2a side surface of the casing 2 is opened. An air supply chamber 13 is formed in the chamber door 11. The air supply chamber 13 is arranged on a front stage with respect to the front-surface opening portion 7 of the drum 1. A sectional area of a part facing the front-surface opening portion 7 of the air supply chamber 13 is set to be approximately five times (preferred to be twice or more; and preferred to be up to approximately eight times in consideration of a casing size) as large as an area of the front-surface opening portion 7 (inner diameter of approximately 500 mm). A front side of the chamber door 11 is formed as a curved surface, and in conformity therewith, a front inner wall 13a of the air supply chamber 13 is also formed as a curved surface. With this, an external appearance with a characteristic design is created, and a volume in the air supply chamber 13 increases.

A maintenance door 15 having a monitoring window 14 provided at the center thereof is additionally attached to the front of the chamber door 11. A grip bar 16 extending in a vertical direction is attached to each side of the maintenance door 15. Further, a product delivery port 17 from which processed products are taken out is attached to a lower portion of the chamber door 11. In the coating apparatus 10, the grip bar 16 arranged on each side of the maintenance door 15 provides to the front an H-shaped design which conventional coating apparatuses do not have. This design provides a design accent (refer to FIG. 2).

Figure 5:
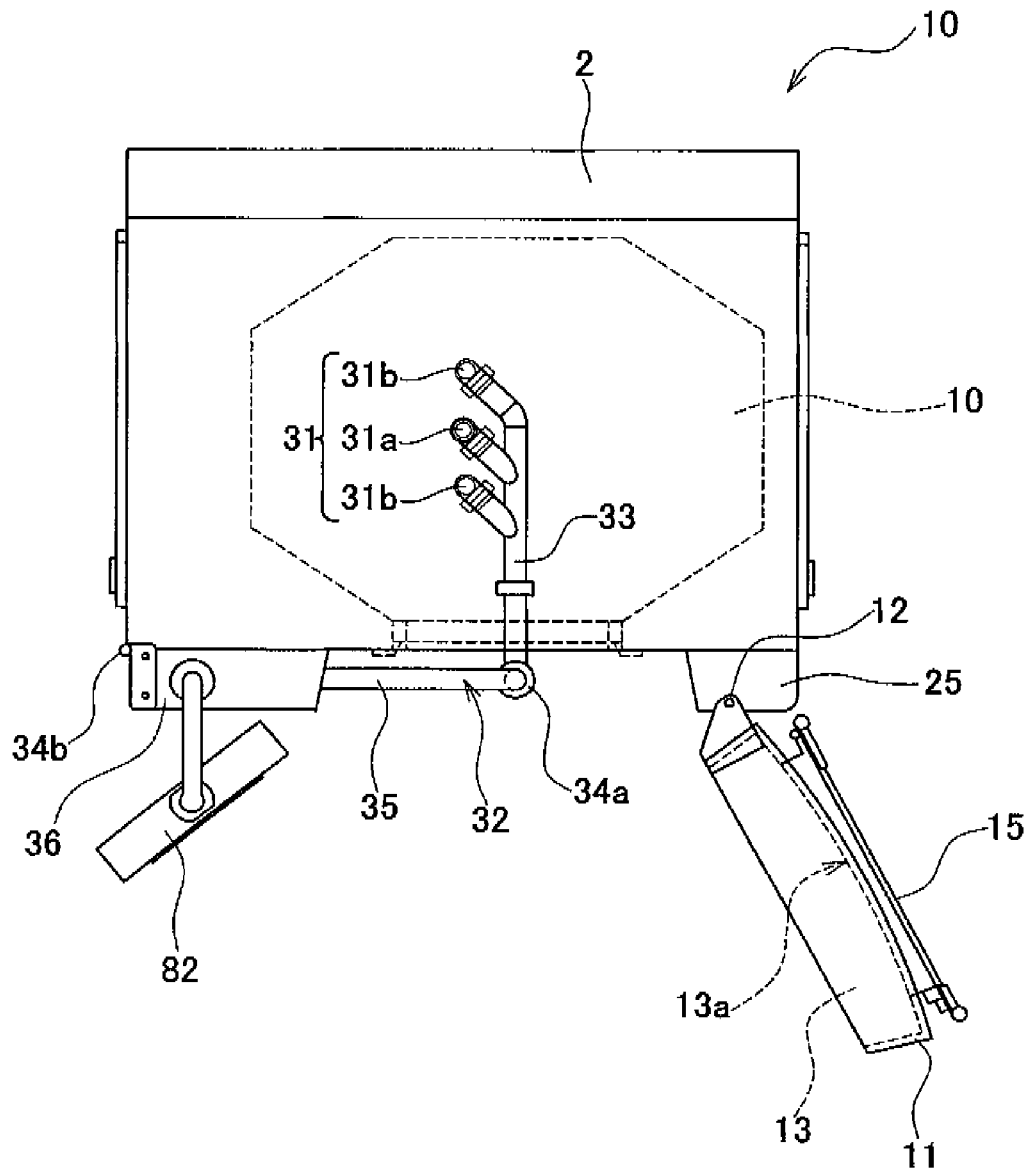
FIG. 5 A plan view illustrating a state in which a chamber door is opened.
Figure 6:
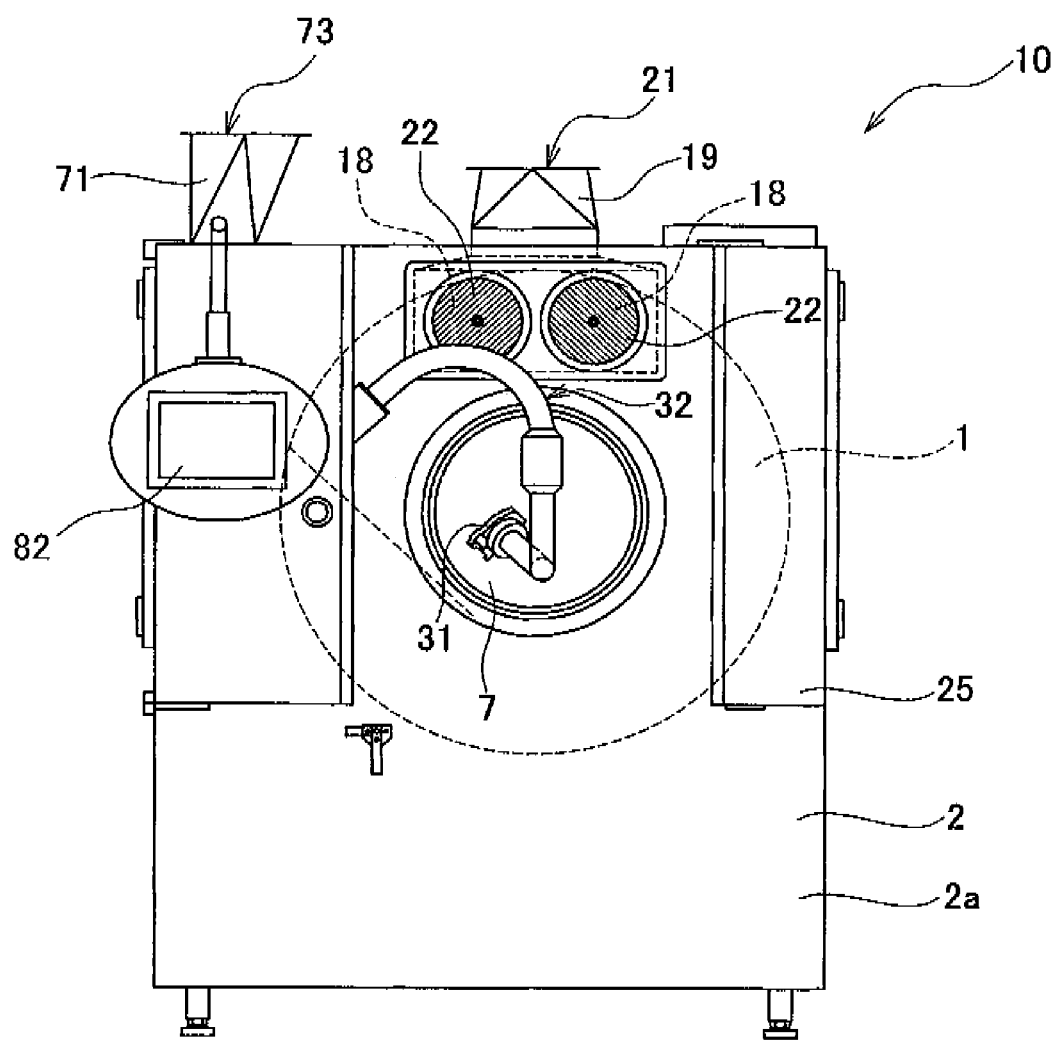
FIG. 6 A front view illustrating the state in which the chamber door is opened.

The chamber door 11 is attached to the casing 2 so as to be opened to the right side. The chamber door 11 can be opened from the apparatus front side with use of the grip bars 16 on the front surface of the chamber. FIG. 5 is a plan view illustrating a state in which the chamber door 11 is opened, FIG. 6 is a front view of the coating apparatus 10 under the state in which the chamber door is opened. As illustrated in FIG. 6, the front wall 2a of the casing is exposed when the chamber door 11 is opened. Then, a state is achieved in which the front-surface opening portion 7 at the end portion of the drum 1 is opened. Above the front-surface opening portion 7 of the front wall 2a of the casing, there is further provided an air supply hole 18. The coating apparatus 10 employs an internal-air-supply structure. Through intermediation of an air supply duct 19 arranged in the casing 2, the air supply hole 18 communicates to an air supply port 21 provided in a casing upper surface 2b. As illustrated in FIG. 1, in the coating apparatus 10, the air supply duct 19 is arranged in a bent manner in an empty space formed above the conical portion 5 in the casing 2. Thus, in accordance with downsizing of the apparatus, a flow rate of the air through the bent duct is reduced.

Figure 7:
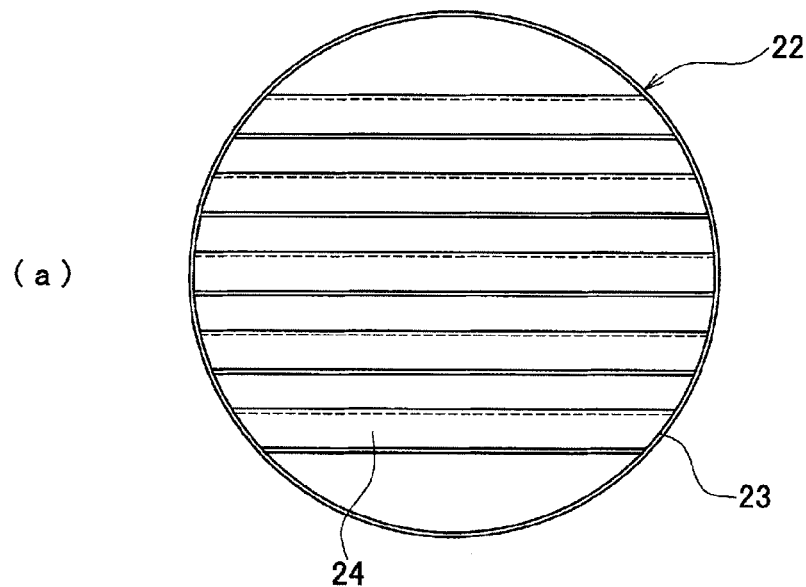
FIGS. 7(a) is a front view of a wind-direction plate, and (b) is a sectional view thereof.
Figure 7:
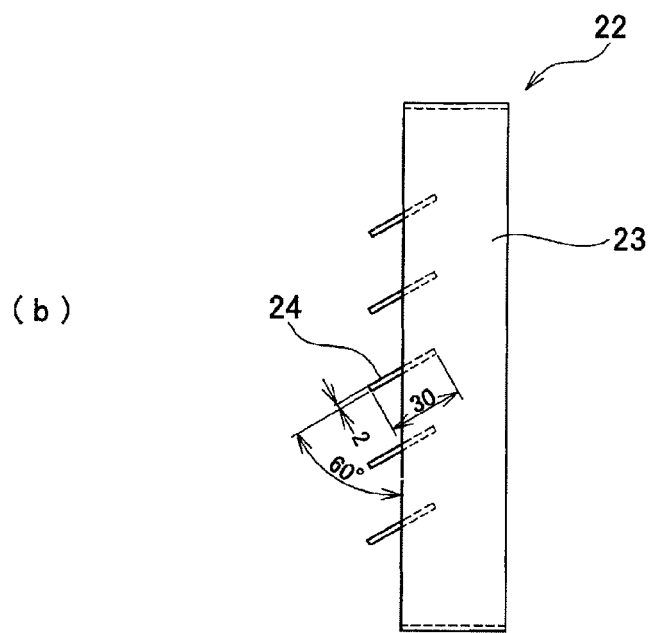

To a front surface of the air supply hole 18, there are attached wind-direction plates 22. FIG. 7(a) is a front view of the wind-direction plate 22, and FIG. 7(b) is a sectional view thereof. The wind-direction plates 22 are attached onto the air supply hole 18, with the right side of FIG. 7(b) being a windward side. As illustrated in FIG. 7(a), the wind-direction plate 22 includes a cylindrical frame body 23 (for example, inner diameter of 200 mm). On an inside of the frame body 23, there are fixed a plurality of louvers 24 (for example, width of 30 mm) by welding. The louvers 24 are attached while being inclined, for example, at 60° with respect to an end surface of the frame body. The air (dry air) supplied from the air supply port 21 is rectified downward by the wind-direction plates 22, and then is discharged from the air supply hole 18.

In the coating apparatus 10, when the chamber door 11 is closed, the front-surface opening portion 7 of the drum 1 faces and communicates to the air supply chamber 13. Accordingly, the air supplied into the air supply port 21 flows into the air supply chamber 13 while being rectified by the wind-direction plates 22. Then, the air is supplied from the air supply chamber 13 into the drum 1 through the front-surface opening portion 7. That is, the coating apparatus 10 supplies the air from the air supply duct 19 into the drum 1 through the air supply chamber 13 having a large volume. Thus, even when ventilation is performed with a large air volume, the flow rate of the air supplied into the drum can be sufficiently reduced and stabilized.

As described above, with respect to the air supplied from the air supply duct 19, the air supply chamber 13 functions as a buffer portion (buffer). Specifically, the air supply chamber 13 reduces the flow rate of the air, and the flow rate in the front-surface opening portion 7 is uniformized over the entire cross-section. Further, in the coating apparatus 10, the front inner wall 13a of the air supply chamber 13 has a curved shape. Thus, the air supplied from the air supply duct 19 into the chamber blows onto the front inner wall 13a facing the air supply hole 18 and having a curved-surface shape, and then is dispersed. As a result, mild airflow is formed. In addition, in the apparatus, the wind-direction plates 22 are attached to the air supply hole 18. Thus, the flow rate is suppressed even at such a stage that the air flows into the air supply chamber 13, and hence the air is rectified. As a result, a buffering effect of the air supply chamber 13 is enhanced. Accordingly, in the coating apparatus 10, supplied air is mild in comparison with that in conventional apparatuses, and the air is supplied to the tablets at a uniform flow rate and a constant flow volume so as to be discharged.

Here, when the air is supplied while the air supply duct is connected to a drum opening portion as in the conventional coating apparatuses, the flow rate of the air supplied into the drum becomes non-uniform. When the supplied air is disturbed in the coating apparatus, the supplied air is biased, which causes disturbance of flow of a spray mist of the coating liquid. When the spray mist is disturbed, spraying cannot be uniformly performed onto the tablets. In addition, the spray mist dries before reaching the tablets, and the dried mist adheres to the drum and contaminates the same. In order to sufficiently reduce and stabilize the flow rate of the air, it is necessary to provide an axially-long straight barrel portion to the drum opening portion. However, with the long straight barrel portion, a distance from a mouth of the drum to a product layer increases, which leads to marked deterioration of workability and causes an increase in size of the apparatus itself.

In terms of this, in the coating apparatus 10, the airflow is stable, and hence the coating process can be performed without disturbance of the spray pattern in the drum. Thus, coating unevenness is reduced, and hence product quality is enhanced. Further, scattering of coating dust is suppressed, and hence man-hours for drum cleaning are reduced. In addition, it is unnecessary to provide the long straight-barrel portion for stabilization of airflow, and hence the distance from the mouth of the drum (front-surface opening portion 7) to the product layer can be reduced. As a result, workability is improved, and the apparatus is downsized. In addition, with use of the chamber door 11 having a large project area, a depth of the chamber door 11 itself can be suppressed. Accordingly, a design can be employed in which the front-surface opening portion 7 comes up close when the maintenance door 15 is opened, which facilitates maintenance work.

Further, with respect to the front wall 2a of the casing, as illustrated in FIGS. 5 and 6, spray guns 31 for coating-liquid spray are inserted into the drum from the front-surface opening portion 7 of the drum 1. The spray guns 31 are attached to a multi-function unit 32 arranged in front of the casing 2. The multi-function unit 32 allows the spray guns 31 to be freely inserted into and taken out from the drum from the apparatus front side. The multi-function unit 32 includes a support arm 35 movable in a direction of an angle of 45°. A support holder 33 to which the spray guns 31 are mounted is attached to the support arm 35. A sugar-coating spray gun 31a and film-coating spray guns 31b are attached to the support holder 33. That is, the spray guns 31 in one unit are capable of performing coating processes of a plurality of types.

Generally, at the time of the sugar-coating process, in many cases, sugar coating is performed after film coating as undercoating. In this case, in the conventional coating apparatuses, after the film coating, the spray gun is exchanged for the sugar-coating spray gun. Accordingly, a work time period for component exchange is required, which leads to a problem of time loss. In terms of this, in the coating apparatus 10, the sugar-coating spray gun 31a and the film-coating spray guns 31b are installed to the multi-function unit 32. Thus, without exchange work of the spray guns, the steps from undercoating to sugar-coating can be continuously performed. Therefore, man-hours required for the exchange work can be reduced, and hence a work time period is shortened and power saving is achieved. As a result, productivity is improved and the coating process can be more efficiently performed.

As described above, the spray guns 31 are attached to the support holder 33. The support holder 33 is connected by a hinge 34a so as to be rotatable relative to the support arm 35. A locking mechanism (not shown) is attached to the hinge 34a. A rotatable state and a non-rotatable state of a part corresponding to the hinge 34a can be arbitrarily set with a pin and the like (not shown). The support arm 35 is attached to a unit cover 36. At a lower end of the unit cover 36, a lower end portion of the support arm 35 is opened as a connection port 35c.

The unit cover 36 is positioned on a left side of the tripartite casing front. When the unit cover 36 is closed, the multi-function unit 32 is arranged in front of the casing 2. Hoses and the like for the spray guns are housed in the multi-function unit 32. In the coating apparatus 10, unlike the conventional apparatuses, piping and the like are not exposed to the front, side surfaces, or the like of the apparatus. Thus, the external appearance of the apparatus can be neat. Note that, a front cover 25 is attached to a right side of the casing front. That is, the front of the casing 2 has a tripartite structure in which the monitoring window 14 is arranged at the center.

The support holder 33 and the support arm 35 are formed of hollow metal pipes (for example, diameter of 50 mm). In the support holder 33 and the like, there are housed hoses (not shown) for supplying the coating liquid and the air-to-be-sprayed to the spray guns 31. The maximum number of the hoses connected to one spray gun is five (spray air, pattern air, cylinder air (needle valve), liquid (forward), and liquid (backflow)). Therefore, the maximum total number of the pipes for three spray guns is fifteen. Note that, when guns of the same type (for example, sugar-coating type) are used, the number of pipes can be appropriately reduced, for example, in the following manners: common piping is branched and connected to the guns; the spray air and the pattern air are sprayed from a common pipe; and a liquid-backflow pipe is omitted.

The hoses connected to the spray guns 31 are drawn out to an outside of the apparatus from the connection port 35c. That is, in the coating apparatus 10, liquid hoses and air hoses are hidden piping, and hence those hoses are not exposed to the outside. Thus, components are less liable to be contaminated, and a maintenance property is enhanced. In addition, the coating liquid and the air are less liable to be influenced by temperature in the drum, and hence coating quality is enhanced.

Figure 8:
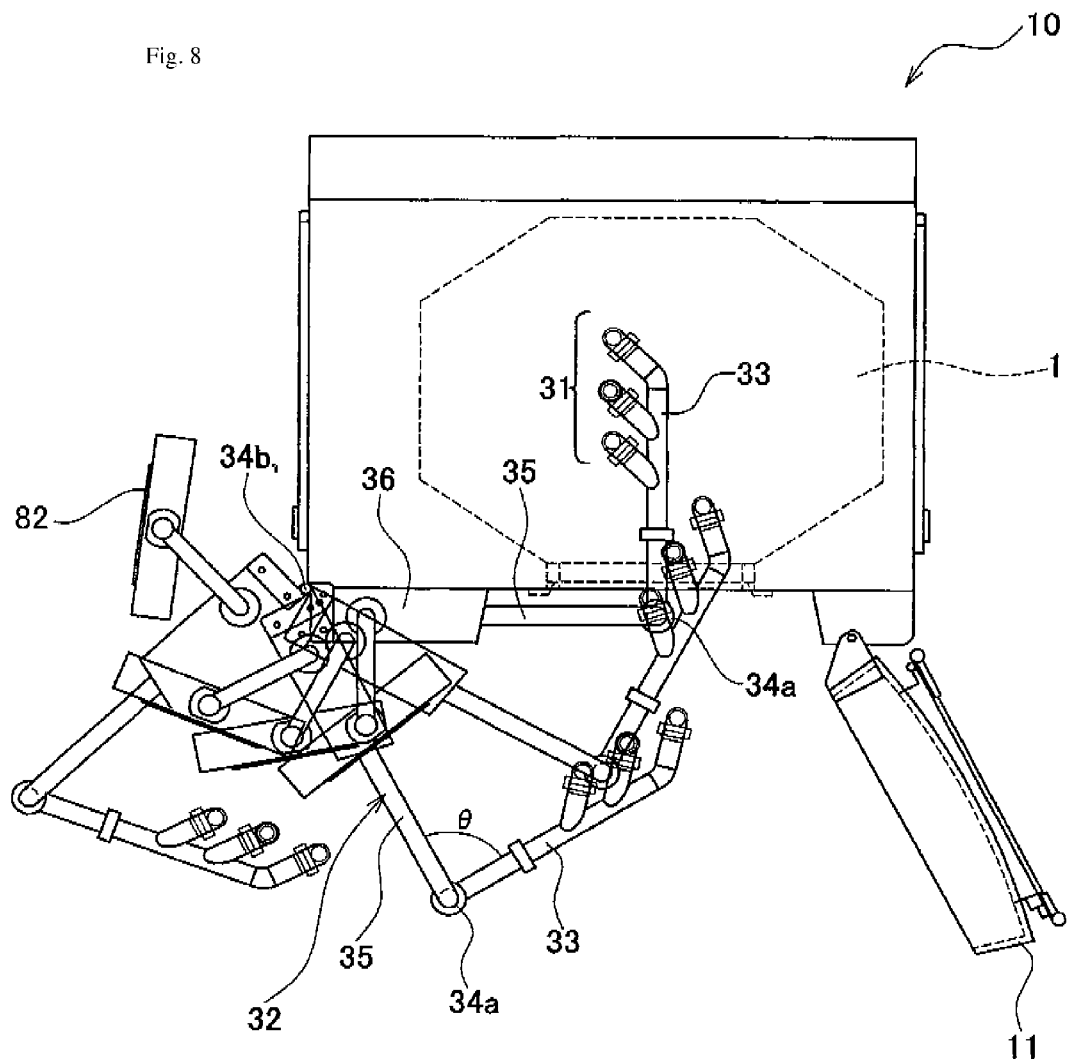
FIG. 8 An explanatory diagram illustrating an operation of a multi-function unit.
Figure 9:
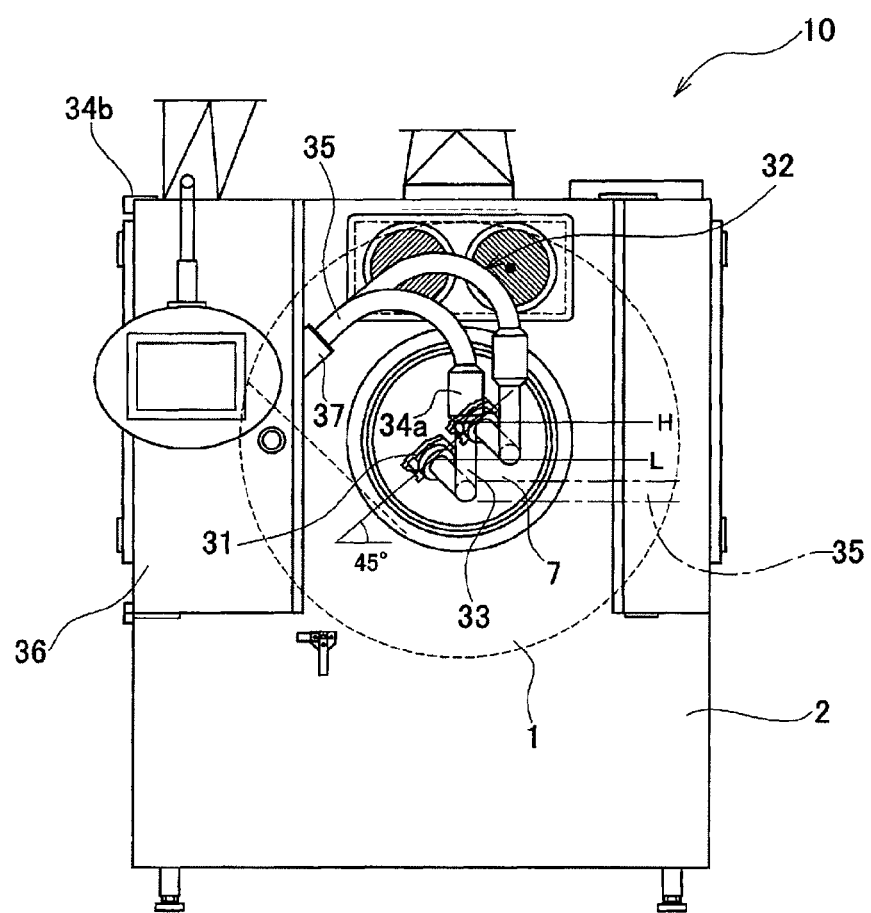
FIG. 9 A front view of the multi-function unit.

The unit cover 36 is attached to the casing 2 by a hinge 34b so as to be openable/closable. FIG. 8 is an explanatory diagram illustrating an operation of the multi-function unit 32, and FIG. 9 is a front view of the multi-function unit 32. As illustrated in FIG. 8, in this embodiment, the multi-function unit 32 and the support holder 33 are connected to each other by the hinge 34b so as to constitute a double-bar linkage mechanism. Specifically, in the coating apparatus 10, by appropriate bending of the support arm 35 and the support holder 33 of the multi-function unit 32, the spray guns 31 are installed so as to be freely inserted into and taken out from the drum 1.

Under a state in which the support holder 33 and the support arm 35 are not bent and remain orthogonal to each other, in order to move the spray guns 31 into and out of the drum, the diameter of the front-surface opening portion 7 must be increased. Further, on the front surface of the apparatus, a larger area must be secured so as to allow the spray guns to move. Meanwhile, in the coating apparatus 10, the support holder 33 and the support arm 35 are folded so that an angle θ formed therebetween is reduced. Thus, the spray guns 31 can be moved into and out of the drum with a small rotation radius. Accordingly, the diameter of the front-surface opening portion 7 and the area for the movement of the spray guns can be reduced, with the result that the apparatus is compactified.

Figure 10:
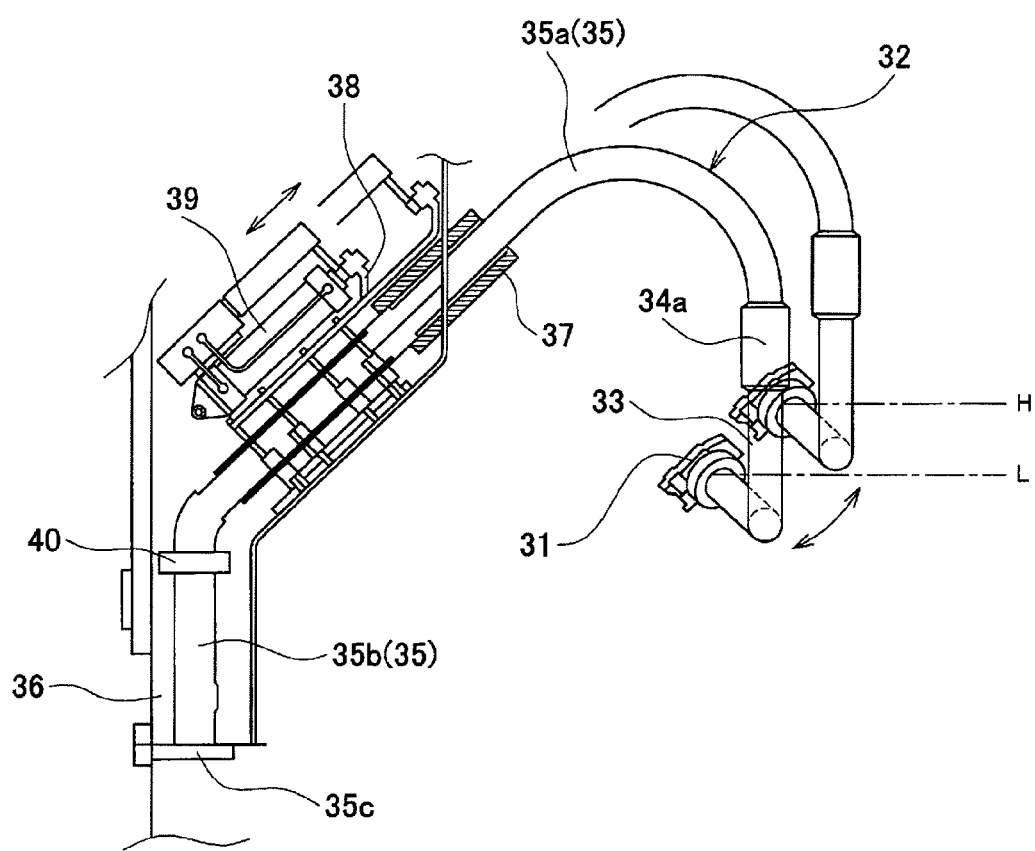
FIG. 10 An explanatory diagram illustrating a structure of a vertical-movement mechanism of the multi-function unit.

As illustrated in FIG. 9, the multi-function unit 32 is arranged so as to be vertically movable in the direction of an angle of 45° (direction substantially perpendicular to a tablet-flow plane). That is, in the coating apparatus 10, positions of the spray guns can be appropriately changed in the drum. FIG. 10 is an explanatory diagram illustrating a structure of a vertical-movement mechanism of the multi-function unit 32. As illustrated in FIG. 10, the support arm 35 has a double-pipe structure. The support arm 35 includes an upper pipe portion 35a and a lower pipe portion 35b connected to each other in the unit cover 36. The upper pipe portion 35a is inserted slidably along an arm guide 37 fixed to the unit cover 36. The upper pipe portion 35a is connected to an air cylinder 39 through intermediation of a bracket 38. The lower pipe portion 35b is fixed to the unit cover 36 by a bracket 40.

When the air cylinder 39 is actuated, the upper pipe portion 35a moves along an axial direction. Then, the multi-function unit 32 moves approximately by 150 mm between a low position L and a high position H illustrated in FIG. 10. Note that, as a drive device for the upper pipe portion 35a, a hydraulic cylinder which is an actuator similarly using fluid pressure may be used instead of the air cylinder 39. Alternatively, an electric motor may be used as the drive device.

Figure 11:
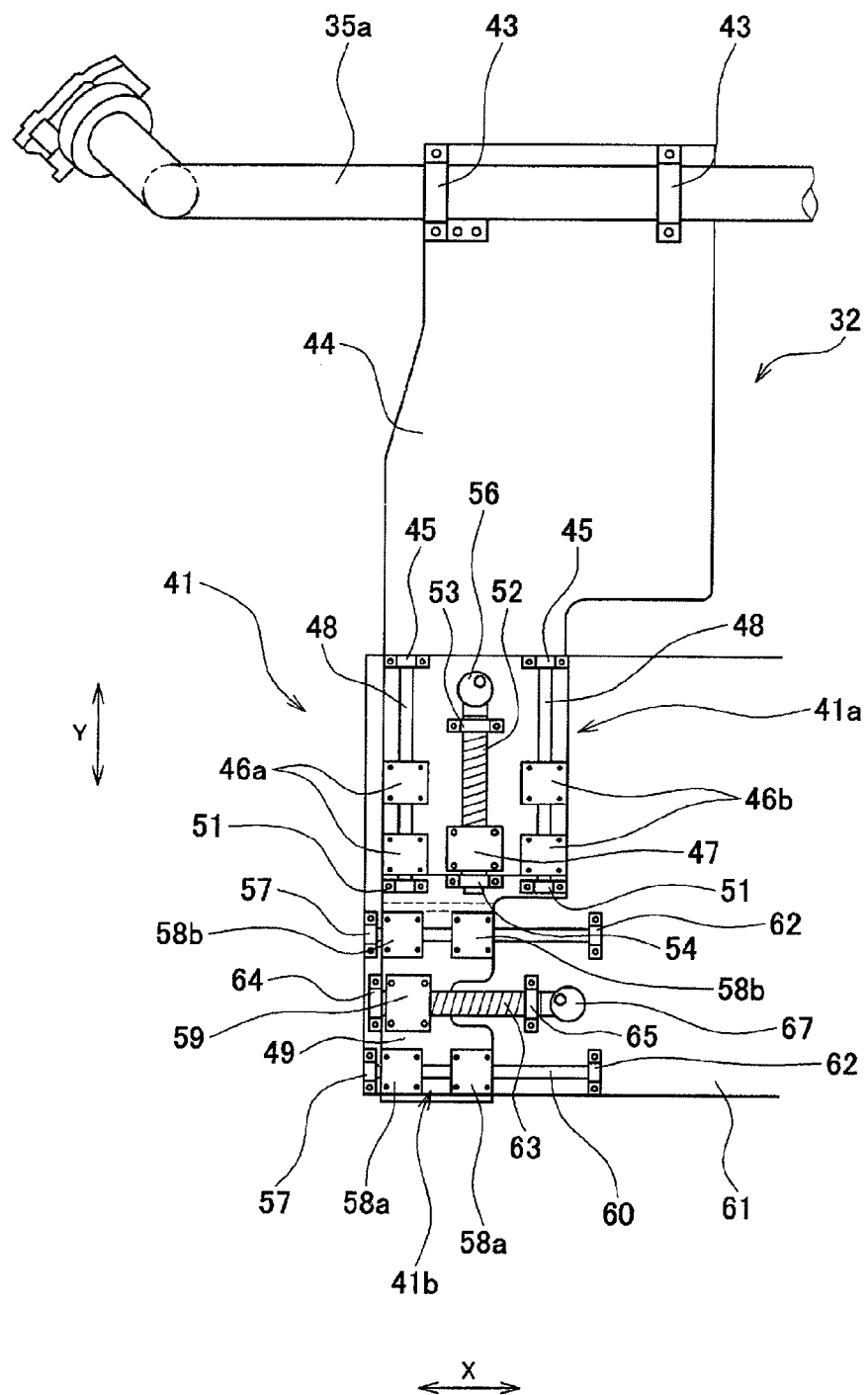
FIG. 11 A front view of a multi-movement mechanism to be manually-operated.
Figure 12:
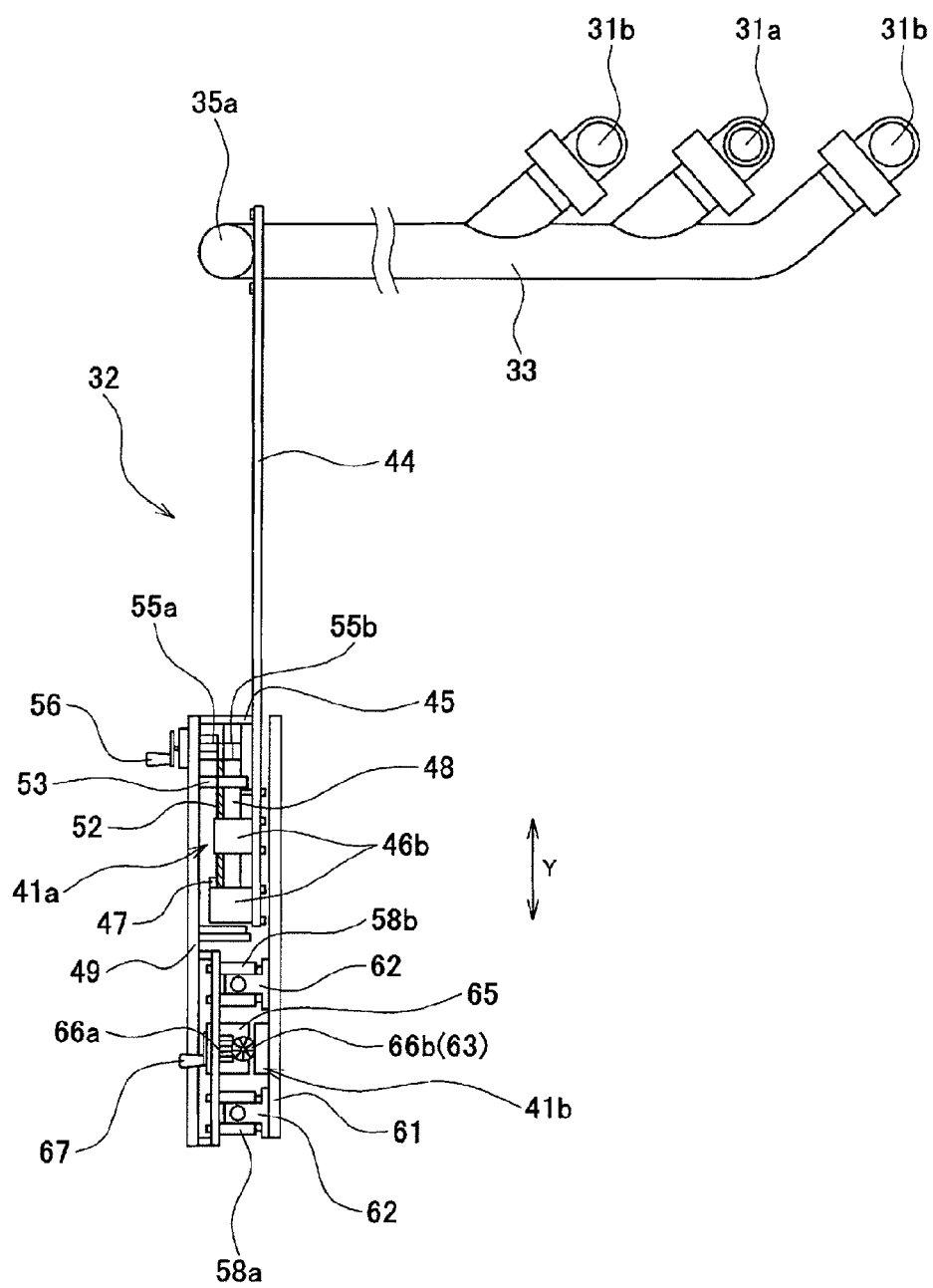
FIG. 12 A side view of the multi-movement mechanism of FIG. 11.
Figure 13:
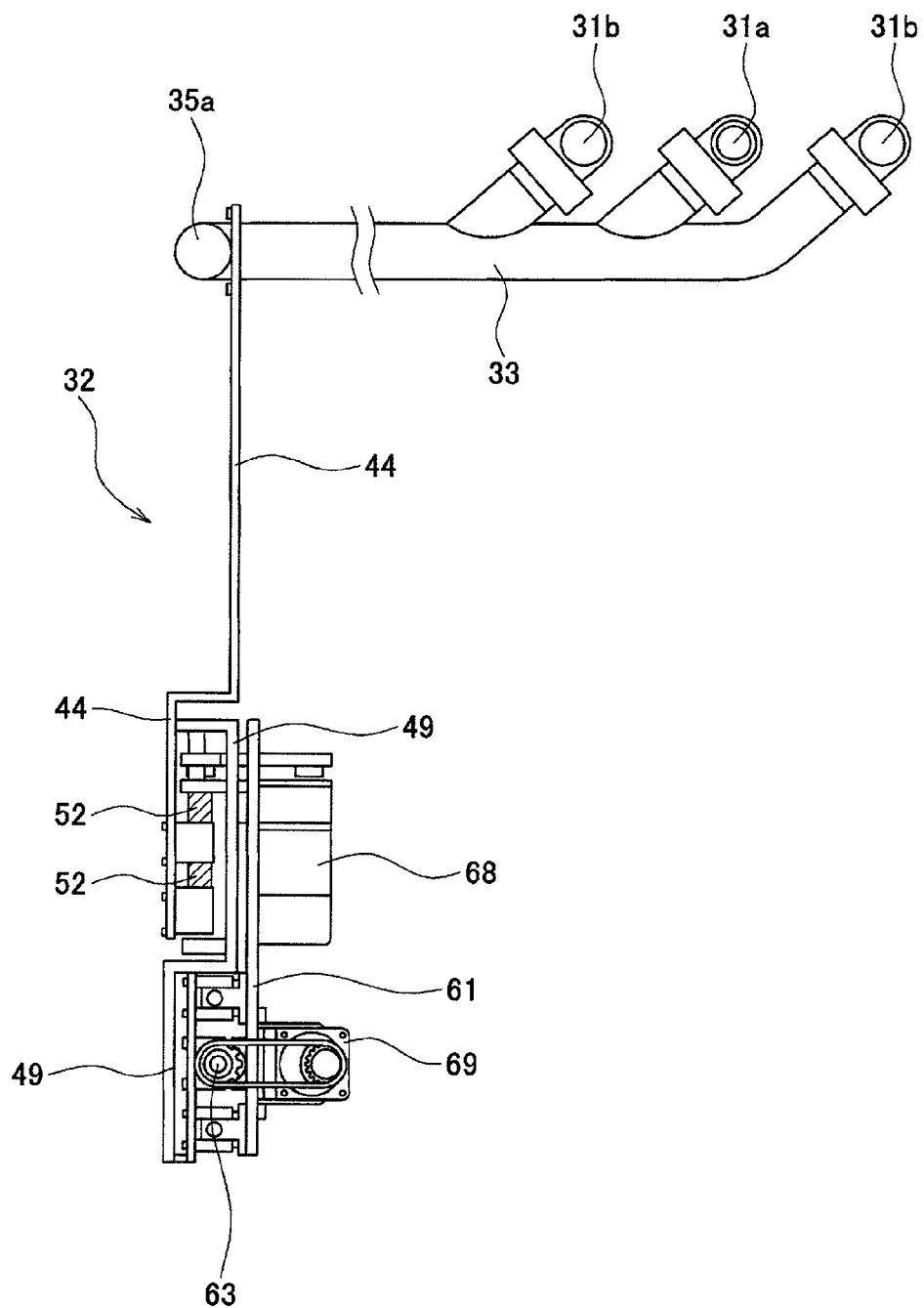
FIG. 13 A side view of the multi-movement mechanism to be driven by a motor.

By the way, although the coating apparatus 10 has a structure in which the multi-function unit 32 moves in the direction of an angle of 45° as illustrated in FIG. 10, a multi-movement mechanism movable in vertical and lateral directions may be used instead thereof. Specifically, the spray guns 31 may be movable to arbitrary vertical (Y direction: perpendicular direction) and lateral (X direction: horizontal direction) positions. FIGS. 11 to 13 illustrate modifications of a multi-function unit using such a multi-movement mechanism. FIG. 11 is a front view of a multi-movement mechanism 41 to be manually-operated, FIG. 12 is a side view of FIG. 11, and FIG. 13 is a side view of a multi-movement mechanism 42 to be driven by a motor. Note that, although being designed to be arranged on the right side of the casing front as illustrated by a dashed line of FIG. 9, as a matter of course, the multi-movement mechanism 41 may be arranged on the left side thereof. Further, in the multi-function units of FIGS. 11 to 13, the support holder 33 is fixed to the support arm 35. Accordingly, the spray guns 31 are inserted into the drum 1 and taken out of the drum 1 without bending of the holder and the arm.

The multi-movement mechanism 41 includes a vertical-movement mechanism 41a and a lateral-movement mechanism 41b. As illustrated in FIGS. 11 and 12, the upper pipe portion 35a of the support arm 35 is fixed by brackets 43 to a vertical-movement base 44 on a vertical-movement-mechanism-41a side. Shaft holders 45, guide blocks 46a and 46b, and a nut block 47 are attached to the vertical-movement base 44. One end sides of guide rods 48 are fixed to the shaft holders 45. The guide rods 48 are respectively supported by the guide blocks 46a and 46b so as to be movable in the axial direction. Another end sides of the guide rods 48 are fixed to shaft holders 51 attached to a lateral-movement base 49.

A screw rod 52, which is a trapezoidal screw, is threadedly engaged with the nut block 47. One end side of the screw rod 52 is supported by a screw holder 53. The screw holder 53 is attached to the lateral-movement base 49 of the lateral-movement mechanism 41b. Another end side of the screw rod 52 is fixed to a screw holder 54. The screw holder 54 is also attached to the lateral-movement base 49. A vertical-movement knob 56 is connected to the one end side of the screw rod 52 through intermediation of gears 55a and 55b. In accordance with rotation of the vertical-movement knob 56, the screw rod 52 is rotated through intermediation of the gears 55a and 55b, with the result that the nut block 47 moves in the axial direction. In this manner, the vertical-movement base 44, to which the nut block 47 is fixed, vertically moves, and the upper pipe portion 35a moves in the vertical direction.

Further, shaft holders 57, guide blocks 58a and 58b, and a nut block 59 are attached to the lateral-movement base 49. One end sides of guide rods 60 are fixed to the shaft holders 57. The guide rods 60 are respectively supported by the guide blocks 58a and 58b so as to be movable in the axial direction. Another end sides of the guide rods 60 are fixed to shaft holders 62. The shaft holders 62 are attached to a unit base 61. Note that, the unit base 61 is fixed to the casing 2.

A screw rod 63, which is a trapezoidal screw, is threadedly engaged with the nut block 59. One end side of the screw rod 63 is fixed to a screw holder 64. The screw holder 64 is attached to the lateral-movement base 49. Another end side of the screw rod 63 is fixed to a screw holder 65. The screw holder 65 is attached to the unit base 61. Similarly to the vertical-movement mechanism 41a, a lateral-movement knob 67 is connected to the one end side of the screw rod 63 through intermediation of gears 66a and 66b. In accordance with rotation of the lateral-movement knob 67, the screw rod 63 is rotated through intermediation of the gears, with the result that the nut block 59 moves in the axial direction. In this manner, the lateral-movement base 49, to which the nut block 59 is fixed, laterally moves, and the upper pipe portion 35a moves in the lateral direction. In other words, by appropriate manipulation of the vertical-movement knob 56 and the lateral-movement knob 67, the upper pipe portion 35a can be moved in the arbitrary vertical and lateral directions.

As described above, when the multi-function unit 32 has such a structure as to be movable in the horizontal direction and the perpendicular direction, a degree of freedom in adjustment of the positions of the spray guns becomes higher, and hence installation positions of the spray guns 31 can be finely set. Accordingly, the coating process can be performed, with the spray guns being constantly set to optimum positions. Thus, in comparison with coating apparatuses in which the spray guns are movable only in one direction, a control for keeping distances constant between tablet surfaces and the spray guns 31 can be easily and accurately effected. With this, without stopping of the apparatus, the coating process can be continuously performed, which enables enhancement of coating-process efficiency and reduction of a manufacturing cost.

Alternatively, the operations as described above may be electrically performed. In the multi-movement mechanism 42, instead of the vertical-movement knob 56 and the lateral-movement knob 67, there are provided a vertical-movement motor 68 and a lateral-movement motor 69. Although the multi-movement mechanism 42 has a structure somewhat different from that of the multi-movement mechanism 41 of FIGS. 11 and 12 due to arrangement of the motors 68 and 69, a basic mechanism and operation are the same as those of the multi-movement mechanism 41. Accordingly, in description of the multi-movement mechanism 42, the members and components same as those of the multi-movement mechanism 41 are denoted by the same reference symbols, and hence detailed description thereof is omitted.

By the way, an air exhaust duct 71 for discharging the air supplied to the drum 1 is connected to the casing 2, and a seal duct 72 and an upper duct 74 are installed in the casing 2. The seal duct 72 is held in sliding contact with the barrel portion 4 of the drum 1. The upper duct 74 is connected to the seal duct 72, and extends to an air exhaust port 73. The air exhaust duct 71 is connected to the air exhaust port 73. The air supplied from the chamber door 11 is discharged from the drum 1 to the seal duct 72, and then discharged to the outside of the apparatus through the upper duct 74 and the air exhaust duct 71.

Meanwhile, when the coating liquids and the like are sprayed in the drum 1 by the spray guns 31 without air-exhaust, humidity in the drum reaches 100%, which produces a misty state in the drum. In this case, in order to exhaust superfluous humidity in the drum so that the coating process is not influenced, the casing 2 is provided with an evaporated-mist exhaust port 75 independent of an air-exhaust system. The evaporated-mist exhaust port 75 is opened to an interior space of the casing 2, and is communicated to the air exhaust duct 71.

When evaporated mist is exhausted, negative pressure is generated in the interior space, which is a sealed space, of the casing 2. Thus, an evaporated-mist intake port 76 is provided in order to compensate an air exhaust amount. A duct (not shown) for communicating the casing interior space and the outside of the casing to each other is attached to the intake port 76. A damper for controlling opening/closing of the duct is installed in the duct. When the evaporated mist is exhausted, the damper is opened so as to intake the outside air. In this manner, a ventilation system narrower than the air-exhaust system performs weak sucking in the drum 1. As a result, the evaporated mist in the drum 1 is discharged to the outside of the apparatus.

In addition, in the coating apparatus 10, spray nozzles 81 for cooling the drum are attached in the casing 2. From the spray nozzles 81, cooling media such as moisturizing air containing a fine mist are sprayed onto an outer periphery of the drum 1. The drum 1 is cooled by evaporation heat of the cooling media. Conventionally, there has been known water spraying for cooling a ventless drum. However, by spray-cooling of the overall-punched drum used in the jacketless-type coating apparatus, the tablets in the drum get wet, which leads to a problem with product quality. In terms of this, with use of a markedly fine mist and in consideration of a spray timing, the apparatus of the present invention overturns such a common sense, that is, makes it possible to perform spray-cooling on the drum 1 having the vents. Therefore, cooling of the overall-punched drum, which has been conventionally impossible, can be performed, and the jacketless-type apparatus can be provided with higher performance.

The plurality of spray nozzles 81 as described above are provided in the casing 2. In the coating apparatus 10, the spray nozzles 81 are arranged at such positions as to be capable of performing spraying onto both the barrel portion 4 and the conical portions 5 (81a for barrel portion, and 81b for conical portions). A distance between the spray nozzles 81 and the drum 1 is set to range approximately from 200 mm to 250 mm. With regard to spray-pattern spreads (spray regions) with respect to the outer peripheral surface of the drum, it is preferred to set a diameter of each of the spray nozzles 81 to range from 50 mm to 400 mm. For example, in the coating apparatus 10, the diameter is set to approximately 300 mm. Note that, in order to suppress intrusion of the mist into the drum 1, it is preferred to attach the spray nozzles 81 to such positions that spraying is performed onto the barrel portion 4 from a tangential direction.

An internal-mix type two-fluid nozzle is used as each of the spray nozzles 81, and a fine mist of a cooling liquid is sprayed from the nozzles to the drum 1. In the coating apparatus 10, water (available at normal temperature) is used as the cooling liquid. In each of the spray nozzles 81, water and the compressed air are mixed with each other in the nozzle so that a cooling medium containing a cooling mist (water mist) formed of markedly fine droplets is generated. It is preferred that an average particle diameter of the cooling mist range from 5 μm or more to 100 μm or less. Note that, the particle diameter larger than 50 μm causes the mist to be evaporated somewhat slowly, and hence the inside of the drum 1 is liable to be moisturized. Thus, it is more preferred that the average particle diameter of the cooling mist be 50 μm or less. Alternatively, a super-fine mist such as what is called dry fog may be used, which has an average particle diameter of 10 μm or less, preferably, approximately of from 5 to 8 μm. Also in this case, with regard to the spray-pattern spreads, although being set to range approximately from 50 mm to 400 mm, preferably, to approximately to 300 mm, it is preferred that the diameter of each of the spray nozzles 81 be larger than that in a case where the average particle diameter of the cooling mist is more than 10 μm.

In other words, as a drum-cooling method in the coating apparatus 10, there may be appropriately employed various spraying modes such as spraying of the fine mist of from more than 10 μm to 100 μm with use of the normal two-fluid nozzle, and spraying of the dry fog of 10 μm or less. Note that, spraying may be performed with use of mists having diameters different from each other onto the ventless conical portions 5 and the whole-periphery-punched barrel portion 4. For example, a relatively large mist of from more than 10 μm to 50 μm may be sprayed to the unventable conical portions 5, and a super-fine mist of from 5 to 8 μm may be sprayed to the overall-punched barrel portion 4.

Such cooling mists are sprayed from the spray nozzles 81 uniformly all over an outside of the drum 1. With this, the barrel portion 4 and the conical portions 5 of the drum 1 are cooled by evaporation heat of the cooling mists adhering thereto. In this case, the sprayed cooling mists have markedly-small particle diameters, and hence are evaporated immediately after adhering to the drum 1. Thus, even when the cooling mists are blown to the drum 1 having the vents, water content is evaporated on a surface of the drum, and hence less liable to intrude into the drum. As a result, the drum can be cooled in a dry environment.

Next, description is made of manufacture of sugar-coated tablets as an example of the coating process using the coating apparatus described above. First, as the tablets 3 to undergo the coating process, tablets such as lactose tablets (for example, diameter of 8 mm, 200 mg/T) are thrown into the drum 1. In the coating apparatus 10, the tablets 3 are thrown in from the front-surface opening portion 7, with the chamber door 11 being opened. In this case, the front-surface opening portion 7 of the coating apparatus 10 comes up close to a worker, and hence it is significantly easy to throw in the tablets. Note that, when the tablets are thrown in, the multi-function unit 32 is removed to the outside of the drum 1. After a predetermined amount of the tablets 3 is thrown in, the multi-function unit 32 is operated so that the spray guns 31 are set in the drum 1. After that, the chamber door 11 is closed, and then a drum-drive motor is activated so as to rotate the drum 1.

Figure 14:
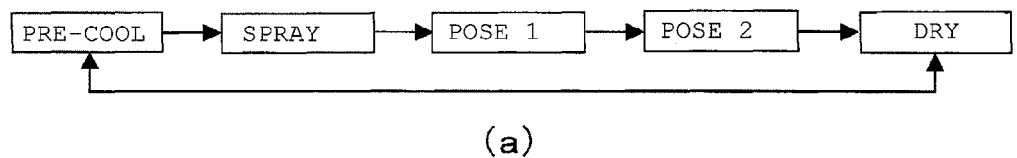
FIGS. 14(a) is an explanatory diagram showing sugar-coating processing steps in the coating apparatus, and (b) is a chart showing inclusion/omission of an air-supply/exhaust operation, an evaporated-mist operation, and a mist-cooling operation in each of the steps of (a).

With respect to the tablets 3 in the drum, the coating liquid (sugar-coating liquid) is sprayed from the spray guns 31, with the drum 1 being rotated. The coating liquid contains a coating substance, a binder, and a solvent, and is sprayed from the spray guns 31 at predetermined pressure. FIG. 14(*a*) is an explanatory diagram showing sugar-coating processing steps in the coating apparatus, and FIG. 14(*b*) is a chart showing inclusion/omission of an air-supply/exhaust operation, an evaporated-mist operation, and a mist-cooling operation in each of the steps of FIG. 14(*a*).

In a conventional coating process, normally, three steps of "spray", "pose 1" (first posing step), and "dry" are repeated. Further, in accordance with various conditions such as coating liquids, four steps are normally performed by adding "pose 2" (second posing step) between the steps of "pose 1" and "dry". "Spray" is a step of spraying the coating liquid without performing air-supply/exhaust, with the drum 1 being rotated (for example, approximately at 8 rpm, hereinafter, description is omitted that numerical examples are merely examples). "Pose 1" is a kneading step of rotating the drum 1 without air-supply so that the coating liquid is spread onto the tablets. "Pose 2" is a step of rotating the drum 1 while only air-exhaust is performed so that the humidity in the drum is lowered prior to a drying step. The coating liquid is not sprayed in the steps of poses 1 and 2. "Dry" is a step of supplying a hot air to the drum 1 (70° C., 12 m³/min) without spraying the coating liquid so that the coating liquid on the tablets is dried and solidified.

Meanwhile, in the coating process of in the apparatus, as shown in FIG. 14(*a*), a pre-cooling step is added prior to the step of "spray" in the conventional processing steps. The pre-cooling step is a step of spraying the cooling medium containing the cooling mist from the spray nozzles 81 so that the drum 1 is mist-cooled. Further, the cooling mist is sprayed by the spray nozzles 81 over the three steps of "pre-cool", "spray", and "pose 1". In other words, as shown in FIGS. 14(*a*) and (*b*), prior to "spray", "pre-cool" is performed in which the cooling mist is sprayed without air-supply/exhaust (30 seconds). Note that, the contents of the process in each of the steps of "spray", "pose 1", "pose 2", and "dry" in FIG. 14(*a*) are the same as those in the above description.

After that, "spray" (2 minutes) and "pose 1" (first posing step: from 3.5 to 4 minutes) are performed, with the cooling-mist spraying being continued. Note that, the cooling-mist spraying may be appropriately ended halfway in the "pose 1" in accordance with processing conditions. In the spraying step (60° C., from 340 to 900 mL/blow), the sugar-coating liquid is sprayed from the spray guns 31 to the tablets. In this case, in accordance with positions of the tablet surfaces, the positions of the spray guns 31 are adjusted to optimum positions by the multi-function unit 32. As described above, the spray guns 31 are movable in the direction of an angle of 45°, and hence the spraying positions with respect to the tablet-flow plane can be kept constant. Accordingly, coating conditions with respect to the tablets are adjustable to a certain or desired mode. In particular, when the multi-movement mechanism 41 is employed, the spray guns 31 have a high degree of freedom in movement, and hence can flexibly deal with various coating conditions.

After "pose 1" is ended, the steps of "pose 2" (second posing step: 0.5 minutes) and "dry" (4.5 minutes) are performed. Then, as shown in FIG. 14(*a*), a series of those steps in which the coating process returns to "pre-cool" after "dry" is repeated a plurality of times (approximately from 20 to 30 times). In this case, when the spraying step is performed immediately after the drying step, spraying is performed under a state in which the drum 1 is heated. Thus, a sugar-coating residue and the like are liable to be generated, which is not preferred to a coating environment. In terms of this, in the coating process, "pre-cool" is performed after the drying step so that the drum 1 is mist-cooled. Accordingly, at the time of the spraying step, the drum 1 is in a cooled state, and hence problems of the sugar-coating residue and the like are less liable to occur. Further, the drum 1 is cooled within a short time period, and hence it is unnecessary to secure the time period for waiting that the drum 1 is cooled. As a result, a processing time period is shortened.

Over the three steps of "pre-cool", "spray", and "pose 1", the cooling mist continues to be sprayed to the drum 1. With regard to this, only a slight amount of water content intrudes in a form of a fine mist into the drum 1. Further, the step of "dry" is performed necessarily after the step of "pose 1". Thus, water content amounts of the tablets during the steps are equal to those in the conventional coating process. Also in the experiments carried out by the inventors, water content rates of the tablets during the drying step and final water-content rates of the tablets were successfully maintained at the same level as that in conventional methods. Further, the cooling mist is sprayed to the drum 1 in the step in which the dry air (hot air) is not supplied, and hence wall surfaces of the drum can be cooled within a short time period, that is, cooling processing efficiency is high. In addition, at the time of mist-cooling, the baffles 26 are cooled together with the barrel portion 4 by the cooling mist. Thus, an effect of increasing the heat radiation areas of the baffles 26 can be further enhanced, which enables the drum 1 to be efficiently cooled.

Note that, although description is made that only a slight amount of the water content intrudes in the form of a cooling mist into the drum 1, as long as mists are sprayed, it cannot be said that there is no intrusion of the water content into the drum 1 at all. Further, air-exhaust is performed in "dry", and hence the cooling mist is liable to intrude into the drum 1 simultaneously therewith. As a countermeasure, in the coating apparatus 10, in terms of safety, the cooling mist is sprayed in such steps as to be little influenced by the cooling mist which may intrude into the drum 1 at least possibility. That is, the cooling mist is sprayed in "pre-cool" in which the inside of the drum 1 has not yet been moisturized, and in "spray" and "pose 1" in each of which the inside of the drum 1 has already been moisturized so that mist-cooling is performed in an environment in which the inside of the drum 1 is wet. With this, without the problems of the intrusion of the water content into the drum, the drum 1 can be cooled by the cooing mist.

As described above, in the coating apparatus 10, even with use of the horizontal-rotation type overall-punched drum, the outer periphery of the drum 1, with which the tablets come into contact, is directly cooled by the fine cooling mist. Thus, solidification and adhesion of the sugar-coating liquid to inner surfaces of the drum can be suppressed, and hence defective products due to peeling or adhesion of solidified matters can be reduced. Accordingly, generation of minute dot-like protrusions on the sugar-coated tablets can be markedly reduced, and actually, almost all the generation of the dot-like protrusions was successfully eliminated in the experiments carried out by the inventors. Further, with use of the horizontal-rotation type drum, damage on the raw-material tablets is suppressed, which also leads to reduction of an incidence of the defective products.

Further, adhesion of the sugar-coating residue to the inner surfaces of the drum is suppressed, and hence the number of times of cleaning the inside of the drum can be reduced, which leads to improvement of processing efficiency and work man-hours. With this, popularization of the jacketless-type coating apparatus having a simple structure and facilitating maintenance is promoted.

The series of the steps as described above is repeated until spraying of a predetermined amount of the coating liquid is ended. In this manner, when desired coating layers are formed on the tablets, the coating process is ended. Note that, also during the coating process, processing conditions can be appropriately observed from the monitoring window 14. The chamber door 11 is opened when the coating process is ended. Then, the multi-function unit 32 is removed to the outside of the drum 1, and a product-delivery tube (not shown) is incorporated into the drum 1. After that, the chamber door 11 is re-closed, and then the product delivery port 17 is opened, with the drum 1 being rotated. In this manner, the products having undergone the coating process are delivered.

The present invention is not limited to the above-described embodiment. Needless to say, various modifications may be made without departing from the scope of the invention.

For example, as a matter of course, the above-mentioned various numerical values are merely examples, and hence may be appropriately changed. Similarly, the objects to be processed in the present invention are not limited to the tablets such as lactose tablets, and the present invention is applicable to food such as confectionery and chewing gum and other medicine. Further, as the coating liquid, there may be employed, other than syrup obtained by dissolution of sugar into water, various sugar-coating liquids obtained by addition of various medicinal properties, flavors, pigments, and the like to the syrup.

In the coating apparatus 10, a control panel 82 is arranged on the left side of the apparatus front surface, and hence the chamber door 11 is opened to the right side. Alternatively, as a matter of course, the chamber door 11 may have a left-open structure. Further, the multi-function unit 32 may be arranged on the right side of the casing front. Still further, although the structure is illustrated in which the front of the casing 2 is tripartite and the chamber door 11 is provided at the center portion thereof, there may be employed a structure in which insides of the left and right unit covers 36 and the front cover 25 are communicated to an inside of the chamber door 11 so that the casing front as a whole constitutes the air supply chamber 13 when the chamber door 11 is closed. With this, the project area and an inner volume of the air supply chamber 13 can be further increased.

In addition, the multi-function unit 32 of the coating apparatus 10 may further include a washing nozzle incorporated therein. With this, the steps from coating to washing can be continuously performed. Note that, as illustrated in FIGS. 5 and 6, in the coating apparatus 10, although the spray guns 31 are arranged on one direction side of the support holder 33 (diagonally left-upward direction in FIG. 6), the spray guns 31 may be arranged on another direction side (diagonally right-downward direction symmetrical with the spray guns 31 of FIG. 6). In this case, installation directions of the spray guns 31 may be changed in accordance with purposes: one for sugar-coating in the one direction; and another for film-coating in the another direction.

Further, the multi-function unit 32 may include vibration means incorporated therein, which enables employment of a reduction system for shaking off tablets left on the support holder 33. In addition, in order to prevent tablets under processing from jumping out from the front-surface opening portion 7 of the drum 1 into the chamber door 11, a scattering prevention member such as a net may be attached to the front-surface opening portion 7. In this case, a rectifying plate may be used as the scattering prevention member so as to further stabilize air-supply.

The invention claimed is:

1. A pan coating apparatus, comprising:
    a rotary drum provided rotatably about a substantially horizontal rotation axis;
    a casing for housing the rotary drum;
    a unit cover attached to the casing so as to be openable/closable;
    a multi-function unit movable in a horizontal direction, the multi-function unit including a support arm attached to the unit cover and a support holder connect to the support arm; and
    a spray gun mounted to the support holder,
    wherein each of the support arm and the support holder is capable of housing therein a hose connected to the spray gun without exposing the hose to an outside,
    wherein the support arm and the support holder are connected to each other by a hinge so as to be rotatable relative to each other in the horizontal direction,
    wherein the spray gun is movable into and out of the rotary drum, and the spray gun is also movable in a vertical direction,
    wherein the support holder rotates relative to the support arm about an axis that is perpendicular to the rotation axis of the drum, and
    wherein the unit cover rotates relative to the casing about an axis that is perpendicular to the rotation axis of the drum, and rotation of the unit cover displaces the support holder and the spray gun.

2. The pan coating apparatus of claim 1,
    wherein the multi-function unit comprises a multi-movement mechanism comprising a vertical-movement mechanism and a lateral-movement mechanism, and
    wherein the support arm is attached to the multi-movement mechanism.

3. The pan coating apparatus of claim 1, wherein the spray gun is a first spray gun, and the apparatus further comprises a second spray gun mounted to the support holder, wherein the first spray gun and the second spray gun are configured to be used for different purposes.

4. The pan coating apparatus of claim 1, wherein the spray gun is a sugar-coating spray gun, and the apparatus further comprises a film-coating spray gun mounted to the support holder.

5. The pan coating apparatus of claim 1, wherein the multi-function unit comprises a multi-movement mechanism comprising a vertical-movement mechanism and a lateral-movement mechanism, and
    wherein the support arm is attached to the multi-movement mechanism.

6. The pan coating apparatus of claim 1, wherein the spray gun is a first spray gun, and the apparatus further comprises a second spray gun mounted to the support holder, wherein the first spray gun and the second spray gun are configured to be used for different purposes.

7. The pan coating apparatus of claim 1, wherein the spray gun is a sugar-coating spray gun, and the apparatus further comprises a film-coating spray gun mounted to the support holder.

8. The pan coating apparatus of claim 1,
wherein the support arm comprises an upper pipe portion and a lower pipe portion, the upper pipe portion being movable in an axial direction relative to the lower pipe portion, and
wherein the upper pipe portion is movable along the axial direction such that the spray gun moves in the vertical direction between a low position L and a high position H.

9. The pan coating apparatus of claim 7, wherein the axial direction is transverse to the horizontal direction and the vertical direction.

* * * * *